United States Patent [19]

Noon et al.

[11] Patent Number: 4,754,876

[45] Date of Patent: Jul. 5, 1988

[54] STORAGE ARRANGEMENTS FOR OPTICAL FIBER CONNECTIONS

[75] Inventors: Laurence Noon; Royston Thornhill, both of Saskatoon, Canada

[73] Assignee: Northern Telecom Limited, Montreal, Canada

[21] Appl. No.: 124,131

[22] Filed: Nov. 23, 1987

[51] Int. Cl.[4] .............................................. B65D 73/02
[52] U.S. Cl. .................................... 206/334; 206/485; 350/96.20; 350/96.21
[58] Field of Search ............... 206/316, 328, 334, 388, 206/485; 350/96.20, 96.21

[56] References Cited

U.S. PATENT DOCUMENTS

| 4,445,750 | 5/1984 | Grois et al. | 350/96.21 |
| 4,678,264 | 7/1987 | Bowen et al. | 350/96.2 |
| 4,715,675 | 12/1987 | Kevern et al. | 350/96.2 |

FOREIGN PATENT DOCUMENTS

| 53715 | 3/1982 | Japan | 350/96.21 |
| 164519 | 9/1984 | Japan | 350/96.2 |

Primary Examiner—David T. Fidei
Attorney, Agent, or Firm—R. J. Austin

[57] ABSTRACT

Storage arrangement for optical fiber connections in which a storage enclosure for storage trays has tray storage mounts and a tray securing means is resiliently flexibly operable to allow for insertion and removal of trays. Particularly, ends of trays have two arms of a bifurcated structure, the arms being resiliently flexible towards one another. A tray mount is a slot which accommodates two arms at one end of a tray and a locking pin holds the arms apart in the assembled position.

11 Claims, 3 Drawing Sheets

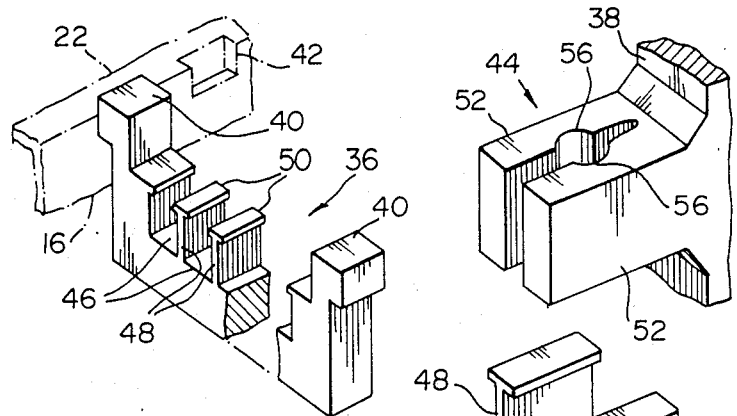
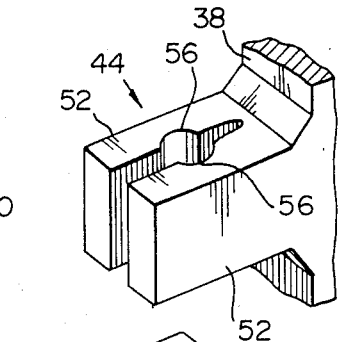
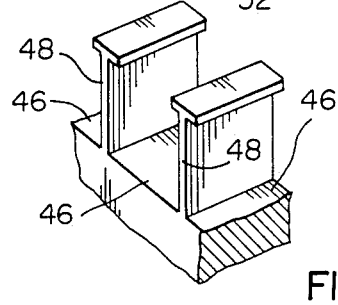
FIG. 3
FIG. 4
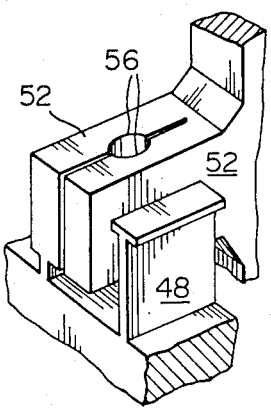
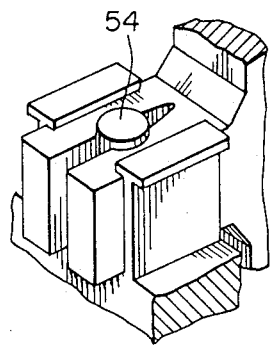
FIG. 5
FIG. 6

STORAGE ARRANGEMENTS FOR OPTICAL FIBER CONNECTIONS

This invention relates to storage arrangements for optical fiber connections.

It is necessary in the use of optical cables to provide connections between fibers of one cable and those of another, for instance, when connecting together lengths of cable or when connecting a branch cable into a main cable. Optical fiber connectors are used for this purpose. Such connectors and lengths of optical fibers bared of surrounding cable material in the regions of fiber connections are housed within storage enclosures. These enclosures house a plurality of storage trays each of which has a guide and a retaining function whereby connectors and bared optical fibers are retained in fixed stored positions so as to prevent signal attenuation problems along the bared fibers. These trays are stacked closely together within the storage facility into which cables extend with ends of the storage facility secured onto the cable sheaths. A problem which exists with such storage facilities is the lack of availability and difficulty in removal of selected trays. In present designs of storage facilities, all of the trays need to be removed from an enclosure and the stack of trays needs to be partially dismantled to reach a selected tray and separate it from other trays to enable an engineer to work on connectors associated with the selected tray.

The present invention seeks to provide a storage arrangement wherein the above problem is minimized or avoided.

According to the present invention there is provided a storage arrangement for optical fiber connections which comprises: (a) a tray storage enclosure for housing a plurality of storage trays for storing optical fiber connectors and lengths of fiber joined to and extending from the connectors, the enclosure having an enclosure body and a cover sealingly attachable to the body to define an enclosure chamber; (b) at least two tray mounts locatable in spaced positions within the enclosure chamber; (c) a plurality of storage trays for location within the chamber and between the tray mounts; and (d) tray securing means defined partly by each tray and partly by each mount for individually detachably securing each tray between and to the tray mounts by a resiliently flexible operation of the securing means.

More particularly the present invention provides a storage arrangement for optical fiber connections which comprises: (a) a tray storage enclosure for housing a plurality of storage trays for storing optical fiber connectors and lengths of fiber joined to and extending from the connectors, the enclosure having an enclosure body and a cover sealingly attachable to the body to define an enclosure chamber; (b) at least two tray mounts locatable in spaced positions within the enclosure chamber; (c) a plurality of storage trays for location within the chamber and between the tray mounts; and (d) tray securing means comprising resilient extensions at ends of the trays and extension receiving slots formed in surfaces of each mount, each said surface facing outwardly of the body with the cover removed, the resilient extensions being movable into and out of the slots when in resiliently flexed conditions and being retainable in the slots in more relaxed conditions.

In a preferred arrangement, each mount defines a slot which is narrower at a top region than in regions below the top region. The resilient extensions are resiliently flexible to pass downwardly through the top regions of the slots but in more relaxed conditions, the extensions have a width greater than the narrow top regions of the slots.

Advantageously in a preferred arrangement, each resilient extension is bifurcated with two arms which in normal relaxed conditions are spaced apart. Resilient flexing of each extension causes the arms to approach one another to reduce their overall width.

It is advantageous to have a locking means to retain the extensions within the recesses so as to prevent any accidental removal of the extensions. The locking means is conveniently provided by a locking pin which is receivable between opposing surfaces of each extension, these opposing surfaces formed with opposing recesses for the purpose of receiving the pin when the overall width of the arms is greater than the narrow top region of a slot.

One embodiment of the invention will now be described by way of example, with reference to the accompanying drawings, in which:

FIG. 3 is an isometric view, to a larger scale than FIGS. 1 and 2, showing the method of location of a tray mount into the enclosure body; and FIGS. 4, 5 and 6, which are also isometric views of larger scale than FIG. 3, show different stages in assembling a tray into a tray mount.

Figure 1:
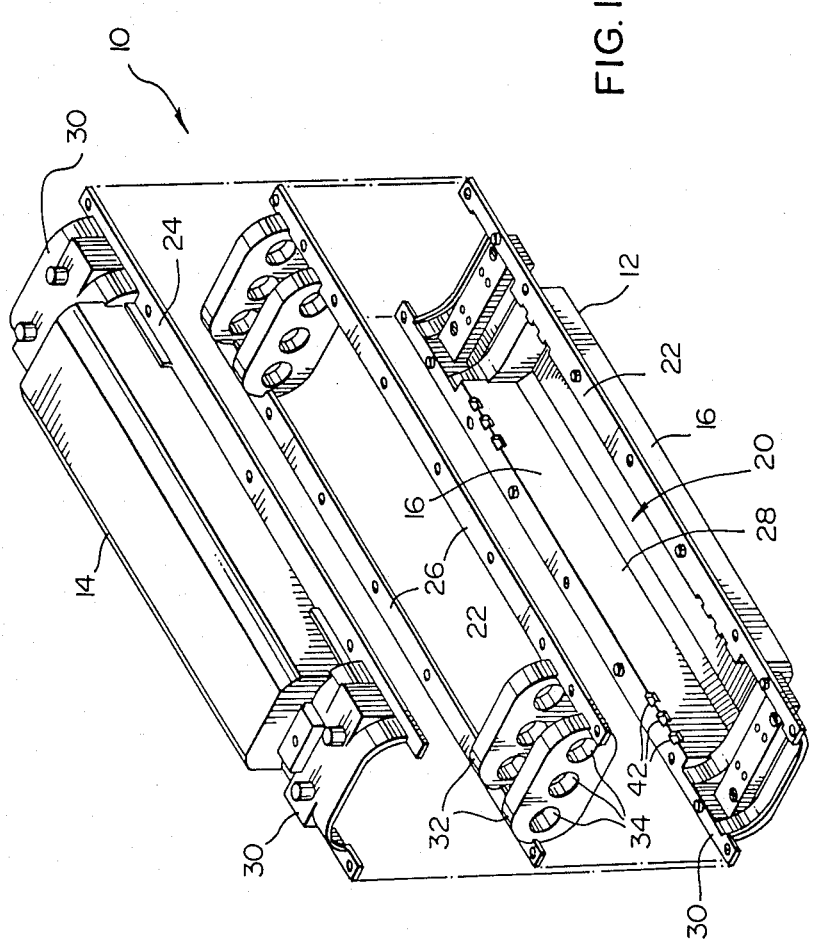
FIG. 1 is an exploded isometric view of a tray storage enclosure of the embodiment.

As shown by FIG. 1, a storage arrangement of the embodiment comprises a storage enclosure 10 basically of conventional construction. Briefly, the enclosure comprises an elongate enclosure body 12 and a cover 14. The body 12 has opposing sides 16, ends 18 and a bottom 20 and planar flanges 22 at the top ends of the sides 16. The cover 14 is formed similarly to the body 12, but is inverted onto the body when assembled to it as shown by FIG. 1. Flanges 24 of the cover 14 mate with the flanges 22 and an edge seal 26 is located between the flanges to seal a chamber 28 from ambient atmosphere. At the ends of the body 12 and cover 14 are provided extensions 30 which mate together to enclose resilient cable sealing pads 32 having apertures 34 formed therein for sealing engagement around cables passing into the chamber 28. The sealing pads form part of a composite sealing member in assembly with edge seals 26.

Figure 2:
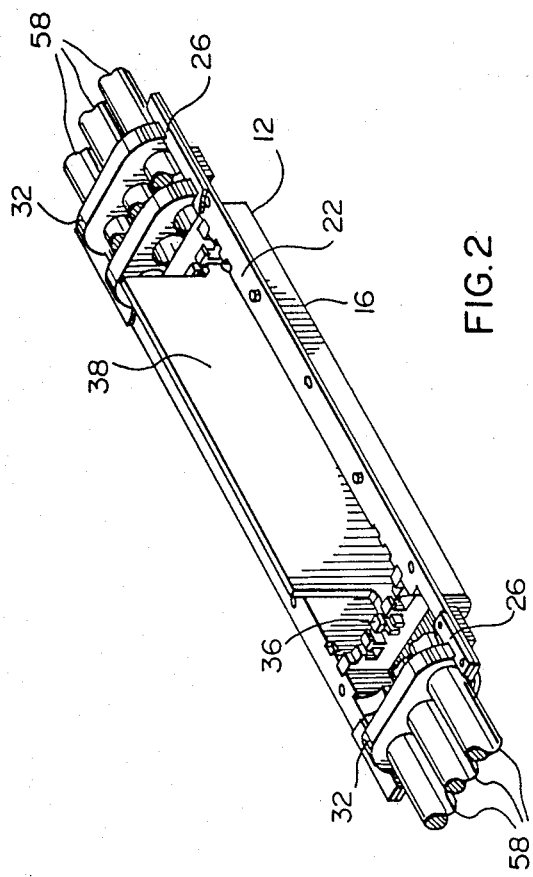
FIG. 2 is a view similar to FIG. 1 of a body of the enclosure housing storage trays held in mounts.

The chamber 28 is for containing a plurality of side-by-side located storage trays for storing optical fiber connectors and lengths of fibers joined to and extending from the connectors. As shown by FIG. 2, the body 12 carries two tray mounts 36 spaced apart along the length of the body, the tray mounts in turn carrying a plurality of storage trays 38. For clarity, only one storage tray 38 is shown.

As shown more particularly by FIG. 3, each tray mount 36 is in the form of a flat plate. This is provided with means for location of each plate within the storage enclosure. This means comprises two end projections 40 lying in the plane of the plate, the projections lying in a top region of the plate when this is in a vertical condition as mounted in the storage enclosures. As can be seen from FIG. 3, each mount is lowered into the body 12 to enable its end projections 40 to be received within recesses 42 formed at the junction of the sides 16 and the flanges 22. FIG. 1 more clearly shows these recesses which are arranged in opposing pairs across the chamber 28. There may be more than one pair of recesses at each end of the chamber, as shown in FIG. 1, to vary the spacing between the mounts to accommodate various lengths of trays. It will be appreciated that with the cover 14 located in position the flanges 24 of the cover overlie the top surfaces of the projections 40 so as to fix the mounts 36 in their desired positions within the chamber 28.

The trays 38 are basically of conventional construction except for ends of the trays which provide part of a tray securing means for detachably holding the trays to the mounts 36. The tray securing means comprises resilient extensions 44 (FIG. 4) lying in the planes of the trays at the tray ends and extension receiving slots 46 formed in edge surfaces of the mounts which face upwardly and outwardly of the body with the cover removed. As can be seen from FIGS. 3, 4, 5 and 6, each of the slots 46 is provided by upwardly extending webs 48 on the upper edge surface of each mount, the webs spaced apart to define the slots between them. The webs are T-shaped in end view so as to have upper outer end portions 50 which are of greater width than the remainder of the webs. Hence top regions of the slots between the end portions 50 of the webs are narrower than other and lower regions of the slots.

Each of the tray extensions 44 is bifurcated such that it is formed with two horizontally spaced apart arms 52 which are resiliently flexible inwardly, i.e. towards each other. In the relaxed conditions of the arms 52, the total width across the arms is greater than the width between adjacent end portions 50 of the webs and may also be greater than the width of the slots below the web portions. The arms may be flexed resiliently inwards whereby their reduced total width is less than the distance between the slots 50 so as to enable the resilient extensions to be passed downwardly between the webs and into the slots.

The storage arrangement is also provided with a locking means for holding the two arms apart so as to prevent them from being inadvertently flexed towards each other as such movement could result in removal of a tray from within the chamber 28. This locking means comprises a locking pin 54 which is insertable downwardly between opposing recesses 56 formed in opposing surfaces of the two arms, the recesses having dimensions such as to accept the locking pin in the spaced apart condition of the arms.

To assemble the trays into the storage enclosure, the two tray mounts are located in position in the enclosure body, as shown in FIG. 2. Each tray in turn is located in a vertical plane and then is lowered with its two extensions 44 in alignment with aligned recesses in the mounts at the two ends of the chamber 28. This position for one mount is shown in FIG. 4. To locate each tray in a fixed position within the body, the arms 52 at each end of the tray are resiliently flexed inwards to reduce their overall width and the tray is moved downwardly by passage of the arms between the end portions 50 of the webs 48. This position is shown in FIG. 5. After the arms have passed downwardly beyond the end portions 50, they are released whereby they return towards their normal unstressed conditions, i.e. they move further apart, until they engage the opposing faces of the webs 48. The recesses 56 are then spaced sufficiently far apart to accept the pins 54 which are inserted between the recesses to prevent the arms from moving together unless required. This position is shown in FIG. 6.

As can be seen from the above description, the trays are located in this fashion vertically side-by-side within the chamber 28. If it should be required to remove any one tray from the chamber for connection of optical fiber ends of cables 58 (FIG. 2) extending into the enclosure and for holding connectors between the cables, then removal of a single selected tray is a simple process. As can be seen from FIGS. 5 and 6, the arms 52 of a tray are sufficiently long to extend right through a corresponding slot 46 and project from the other side. To remove the tray, the pins 54 at its two ends are removed, possibly by the use of gripping pliers. The projecting ends of the arms 52 are then urged together so as to reduce the overall width of each projection 44 whereby the tray may be removed vertically with the arms passing between the end portions 50 of the webs. As can be seen, therefore, removal of a single tray for connection or maintenance purposes is a simple operation and is not hampered by the location of other trays. Furthermore, removal of a single tray for each operation avoids the possibility of having a large number of removed trays lying loosely around the enclosure with their accompanying lengths of optical fiber and connectors.

What is claimed is:

1. A storage arrangement for optical fiber connectors comprising:
    (a) a tray storage enclosure for housing a plurality of storage trays for storing optical fiber connectors and lengths of fiber joined to and extending from the connectors, the enclosure having an enclosure body and a cover sealingly attachable to the body to define an enclosure chamber;
    (b) at least two tray mounts locatable in spaced positions within the enclosure chamber;
    (c) a plurality of storage trays for location within the chamber and between the tray mounts; and
    (d) tray securing means defined partly by each tray and partly by each mount for individually detachably securing each tray between and to the tray mounts by a resiliently flexible operation of the securing means.

2. A storage arrangement for optical fiber connectors which comprises:
    (a) a tray storage enclosure for housing a plurality of storage trays for storing optical fiber connectors and lengths of fiber joined to and extending from the connectors, the enclosure having an enclosure body and a cover sealingly attachable to the body to define an enclosure chamber;
    (b) at least two tray mounts locatable in spaced positions within the enclosure chamber;
    (c) a plurality of storage trays for location within the chamber and between the tray mounts; and
    (d) tray securing means comprising resilient extensions at ends of the trays and extension receiving slots formed in surfaces of the mounts, each said surface facing outwardly of the body with the cover removed, the resilient extensions being movable into and out of the slots when in resiliently flexed conditions and being retainable in the slots in more relaxed conditions.

3. A storage arrangement according to claim 2 wherein each mount defines each slot with an opening at one end of the slot and at the top of the slot, the slot being narrower in a top region than in regions below the top region and the resilient extensions are resiliently flexible to pass downwardly through the narrow top regions of the slots and in the more relaxed conditions have a width greater than the narrow top regions.

4. A storage arrangement according to claim 3 wherein each tray is formed at each end with a bifurcated resilient extension provided by two arms which, in normal relaxed conditions, are spaced apart, the arms approaching one another to reduce their overall width in resilient flexed conditions.

5. A storage arrangement according to claim 4 provided with a locking pin for each extension and the two arms of each extension have opposing surfaces which are formed with opposing recesses to receive the locking pin in the space between the arms when the overall width of the arms is greater than that of the narrow top region of the associated slot.

6. A storage arrangement according to claim 3 wherein each mount comprises a plate having means to locate it in a desired position within the enclosure chamber with said surface being an edge surface of the mount, each mount formed with a plurality of upwardly extending webs spaced apart along said edge surface to define the slots between them, the webs having outer end portions of greater width that the remainder of the webs to provide the narrower top regions of the slots.

7. A storage arrangement according to claim 4 wherein each mount comprises a plate having means to locate it in a desired position within the enclosure chamber with said surface being an edge surface of the mount, each mount formed with a plurality of upwardly extending webs spaced apart along said edge surface to define the slots between them, the webs having outer end portions of greater width that the remainder of the webs to provide the narrower top regions of the slots.

8. A storage arrangement according to claim 5 wherein each mount comprises a plate having means to locate it in a desired position within the enclosure chamber with said surface being an edge surface of the mount, each mount formed with a plurality of upwardly extending webs spaced apart along said edge surface to define the slots between them, the webs having outer end portions of greater width that the remainder of the webs to provide the narrower top regions of the slots.

9. A storage arrangement according to claim 3 wherein each mount comprises a plate having end projections for reception within recesses in sides of the body to locate the mount in a desired position within the enclosure chamber with said surface being an edge surface of the mount, the cover engageable with the projections to retain the mount in position and each mount is formed with a plurality of upwardly extending webs spaced apart along said edge surface to define the slots between them, the webs having outer end portions of greater width than the remainder of the webs to provide the narrower top regions of the slots.

10. A storage arrangement according to claim 4 wherein each mount comprises a plate having end projections for reception within recesses in sides of the body to locate the mount in a desired position within the enclosure chamber with said surface being an edge surface of the mount, the cover engageable with the projections to retain the mount in position and each mount is formed with a plurality of upwardly extending webs spaced apart along said edge surface to define the slots between them, the webs having outer end portions of greater width than the remainder of the webs to provide the narrower top regions of the slots.

11. A storage arrangement according to claim 5 wherein each mount comprises a plate having end projections for reception within recesses in sides of the body to locate the mount in a desired position within the enclosure chamber with said surface being an edge surface of the mount, the cover engageable with the projections to retain the mount in position and each mount is formed with a plurality of upwardly extending webs spaced apart along said edge surface to define the slots between them, the webs having outer end portions of greater width than the remainder of the webs to provide the narrower top regions of the slots.

* * * * *